US006236505B1

(12) United States Patent
Fleck

(10) Patent No.: US 6,236,505 B1
(45) Date of Patent: May 22, 2001

(54) BINOCULARS

(76) Inventor: John E. Fleck, 33527 5th Pl. SW., Federal Way, WA (US) 98023

( * ) Notice: Subject to any disclaimer, the term of this patent is extended or adjusted under 35 U.S.C. 154(b) by 0 days.

(21) Appl. No.: 09/333,752

(22) Filed: Jun. 15, 1999

(51) Int. Cl.[7] .................................................. G02B 23/00
(52) U.S. Cl. ......................... 359/414; 359/407; 359/410; 359/418; 359/435
(58) Field of Search .......................... 359/407, 408–409, 359/410, 411, 414, 416, 417, 418, 435

(56) References Cited

U.S. PATENT DOCUMENTS

| D. 275,205 | 8/1984 | Nakayama ........................... D16/133 |
| D. 330,037 | 10/1992 | Wakayama et al. ................. D16/133 |
| D. 373,371 | 9/1996 | Chan .................................... D16/133 |
| D. 373,592 | 9/1996 | Chan .................................... D16/133 |
| 2,598,145 | * 5/1952 | Steadman, Jr. ....................... 359/410 |
| 4,478,498 | 10/1984 | Ohno .................................... 350/546 |
| 5,058,990 | 10/1991 | Bush .................................... 359/474 |
| 5,218,470 | 6/1993 | Mizukawa et al. ................... 359/474 |
| 5,309,281 | 5/1994 | Rover .................................... 359/474 |
| 5,390,047 | 2/1995 | Mizukawa ............................ 359/466 |
| 5,499,136 | 3/1996 | Jones .................................... 359/474 |
| 5,506,726 | 4/1996 | Tahira ................................... 359/480 |
| 5,552,932 | 9/1996 | Schultz ................................. 359/480 |
| 5,557,457 | 9/1996 | Esperti ................................. 359/408 |
| 5,633,753 | 5/1997 | Fantone et al. ...................... 359/412 |
| 5,774,263 | 6/1998 | Roy et al. ............................ 359/469 |
| 5,822,115 | 10/1998 | Umeda et al. ....................... 359/412 |
| 5,886,815 | 3/1999 | Nishitani ............................. 359/417 |
| 5,986,802 | * 11/1999 | Byers .................................. 359/408 |

* cited by examiner

Primary Examiner—Cassandra Spyrou
Assistant Examiner—Craig Curtis
(74) Attorney, Agent, or Firm—Seed IP Law Group PLLC

(57) ABSTRACT

A binocular includes a hood, an eyepiece lens panel, and an objective lens panel. The hood has top, left side, and right side portions that are integrally formed. The left and right side portions have free edges that extend downwardly from the top to form an open bottom. The open bottom of the hood allows the hood to flex when an outwardly directed force is applied so that the left and right sides can be further separated from one another. This separation allows the eyepiece lens panel and the objective lens panel to be inserted within the hood during assembly of the binoculars to be held by the hood. The eyepiece lens panel has a flat plate frame and two lenses that are integrally formed as a one piece construction. The objective lens panel also has a flat plate frame and two lenses that are also integrally formed as one piece. The hood may further include alignment members to secure and align the eyepiece lens panel. The objective lens panel may further include guides to moveably attach the objective lens panel to the free edges of the hood. The objective lens panel can then be slid along directions of the free edges for focusing purposes. In some embodiments, both the eyepiece and the objective lens panel flat plate frames are transparent to further enhance the utility of the binoculars. The lenses may have large diameters to increase field of view of the binoculars and to allow interpupilary distance between the eyepiece lens panel lenses to be fixed.

48 Claims, 4 Drawing Sheets

BINOCULARS

TECHNICAL FIELD

The present invention relates generally to binocular optical systems, and more particularly, to binoculars that have a low piece count, simple assembly, and sturdy construction.

BACKGROUND TO THE INVENTION

Conventional binoculars are generally composed of many individual components so that the number of components or piece count for the binoculars is relatively high. A high piece count for binoculars requires numerous steps in assembly and complex supply logistics to insure availability of all pieces at assembly time. Also, typically, some components of conventional binoculars undergo rather elaborate manufacturing processes to insure adequate quality such as the precision optical lens. The complexity of design, large number of parts and difficult assembly required contribute to the high cost of most binoculars. Consequently, conventional binoculars are sold in places such as sporting goods stores, department stores, camera stores, and other stores where optical equipment is sold.

Situations arise at various events where potential users of binoculars realize during the event that binoculars would be useful but they either have forgotten to bring their own along or have never acquired any. Even if binoculars were sold at the event, the cost would be too great. After the event the need is no longer present and generally binoculars are many times not purchased for the next event.

Prior attempts have been made to reduce the price of binoculars so that they could be sold, for instance, at concession stands for sporting events. Many of these prior art attempts have focused on using inexpensive materials for the binocular support structure. Some attempts, for instance, have used cardboard or a combination of cardboard coated with a sheet of synthetic resin material for the support structure. Although the piece count for these products may be lower than typical binoculars there are still many pieces involved. For instance, since lenses cannot be made of cardboard, the lenses are individually mounted in the support structures often with individual frame inserts that further add to the piece count and manufacturing cost. Durability and structural integrity of the cardboard construction also has generally been less than desirable compared with construction of binoculars with higher piece counts.

Other prior art attempts at reducing the price of binoculars have used other materials and configurations to insure better durability and structural integrity than does cardboard construction. However, these other attempts have been unsuccessful since the piece count for the binoculars have remained relatively high.

Furthermore, these and other prior art binoculars have been only marginally suitable for many events in which binoculars would be useful. Events which involve episodes of fast paced action make pointing of the prior art binoculars toward the field of interest and subsequent tracking of the action difficult and often too slow to be useful. As a result, use of prior art binoculars is generally limited to periods of slower paced action or during times between action such as during huddles at football games. The users then rely on their own eyesight without aid from the binoculars when the action either resumes or the pace of the action becomes too quick for the binoculars. These directing and tracking limitations, however, defeat the purpose of prior art binoculars since many of the most interesting portions of events occur during episodes of fast paced action when magnification of viewing would be desirable.

SUMMARY OF THE INVENTION

The present invention resides in a binoculars. Aspects of the binoculars include a support member having left and right side portions integrally formed with a top portion. The top portion has left and right side portions and an inner surface. The left and right side portions have upper and lower portions and an inner surface. The upper portions of the left and right side portions are integral with the left and right portions respectively of the top portion. The left and right side portions extend from the inner surface of the top portion such that portions of the inner surface of the top portion and the left and right side portions together define an unobstructed space therebetween. The lower portion of the left side portion has a lower free edge portion. The lower portion of the right side portion has a lower free edge portion. The lower free edge portion is in opposing relation and defines an open ended lower extent of the unobstructed space. An eyepiece lens panel has left and right lenses and a frame. The eyepiece lens panel frame is positioned within the unobstructed space and abutting the support member at a rearward end thereof. The objective lens panel has left and right lenses and a frame. The objective lens panel frame is moveably positioned within the unobstructed space toward a forward end of the support member and moveably attached to the left and right side portions of the support member.

DETAILED DESCRIPTION OF THE INVENTION

Figure 1:
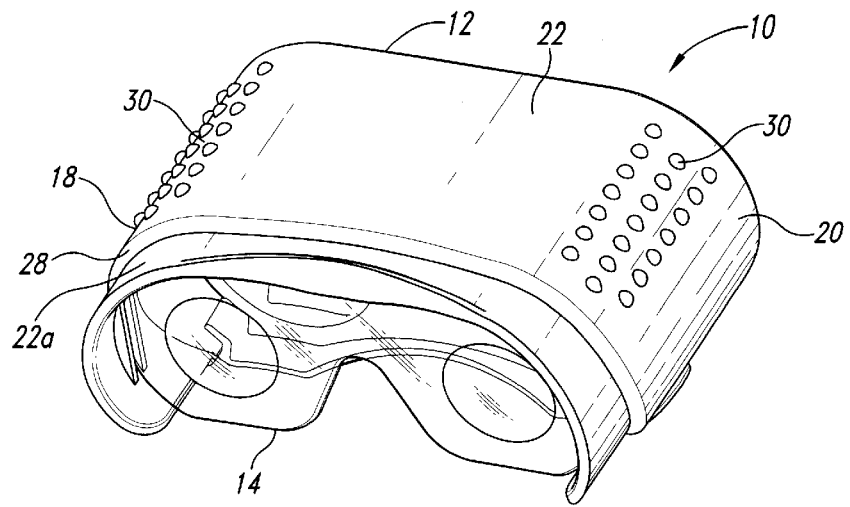
FIG. 1 is a top isometric view of binoculars embodying the present invention having a hood, eyepiece lens panel, and objective lens panel.

As shown in the drawings for purposes of illustration, the present invention is embodied in binoculars, indicated generally by reference 10. The binoculars 10 are formed by a hood 12, an eyepiece lens pane 14, and an objective lens panel 16. The eyepiece lens panel 14 and the objective lens panel 16 are shown separated from the hood 12 in FIG. 2.

Figure 2:
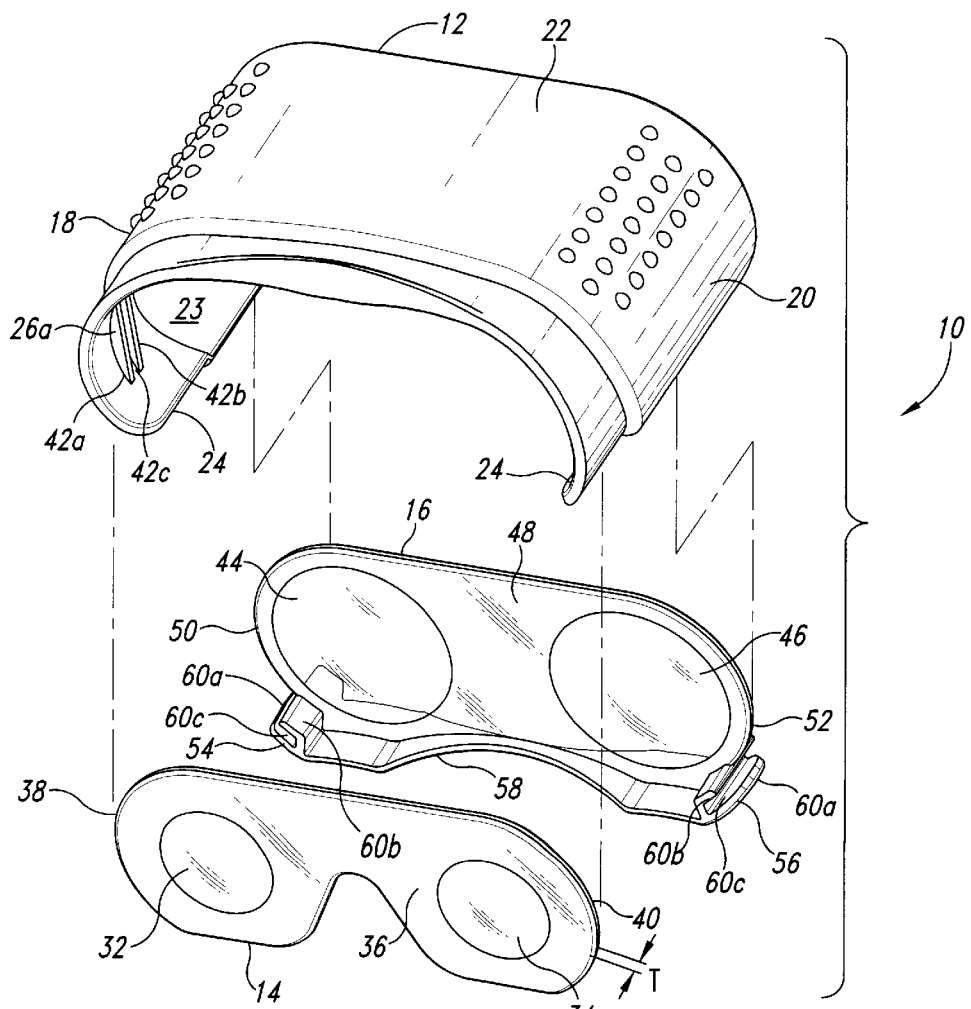
FIG. 2 is an exploded top isometric view of the binoculars of FIG. 1.

The hood 12 has a one piece construction with left and right side portions 18 and 20, and a top portion 22 extending therebetween. The left and right side portions 18 and 20 and top portion 22 are integrally formed together as a single piece. The top portion 22 and the left and right side portions 18 and 20 have inner surfaces 23 that together define an unobstructed space therebetween. The top portion 22 has a top surface portion 22*a* that is flat in one embodiment or nearly flat with only a slight curvature in another embodiment. Both the left and right side portions 18 and 20 of the hood 12 are substantially curved, as shown in FIGS. 1 and 2, with their inner surfaces 23 being curved to accommodate correspondingly curved left and right side edges 14a and 14b, of the eyepiece lens panel 14 and left and right side edges, 16a and 16b, of the objective lens panel 16. The left and right side portions 18 and 20 of the hood 12 both have lower portions with free edge portions 24. The free edge portions 24 are in opposing relation that defines an open ended lower extent of the unobstructed space. The hood 12 serves as a support member that holds the eyepiece lens panel 14 and the objective lens panel 16 through a clamping action due in part to the open bottom combined with a resilient nature of material used to construct the hood. In some embodiments, the hood further includes alignment members 26a, 26b and 26c (FIGS. 2 and 4), that engage edges of the eyepiece lens panel 14 to assist in securing and aligning the eyepiece lens panel within the hood 12.

Figure 3:
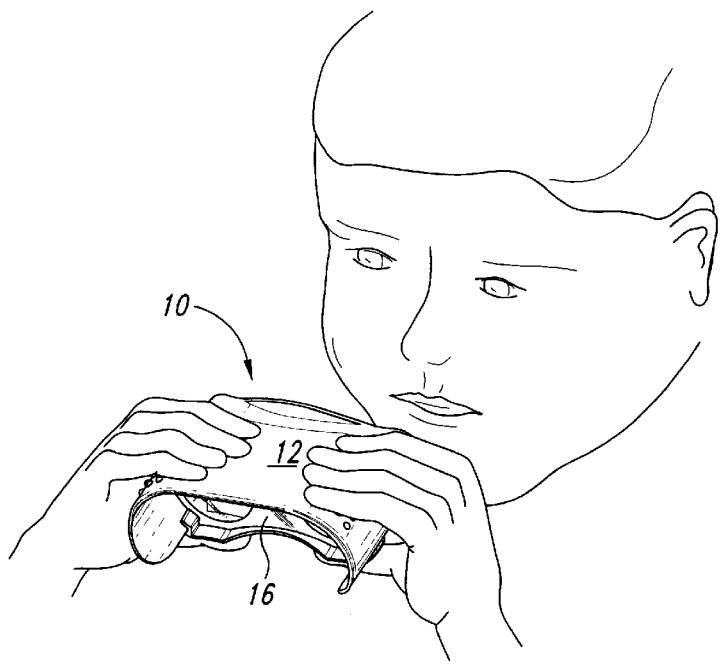
FIG. 3 is a top isometric view of the binoculars of FIG. 1 being held by the user illustrating initial directing of the binoculars toward a field of interest.
Figure 6:
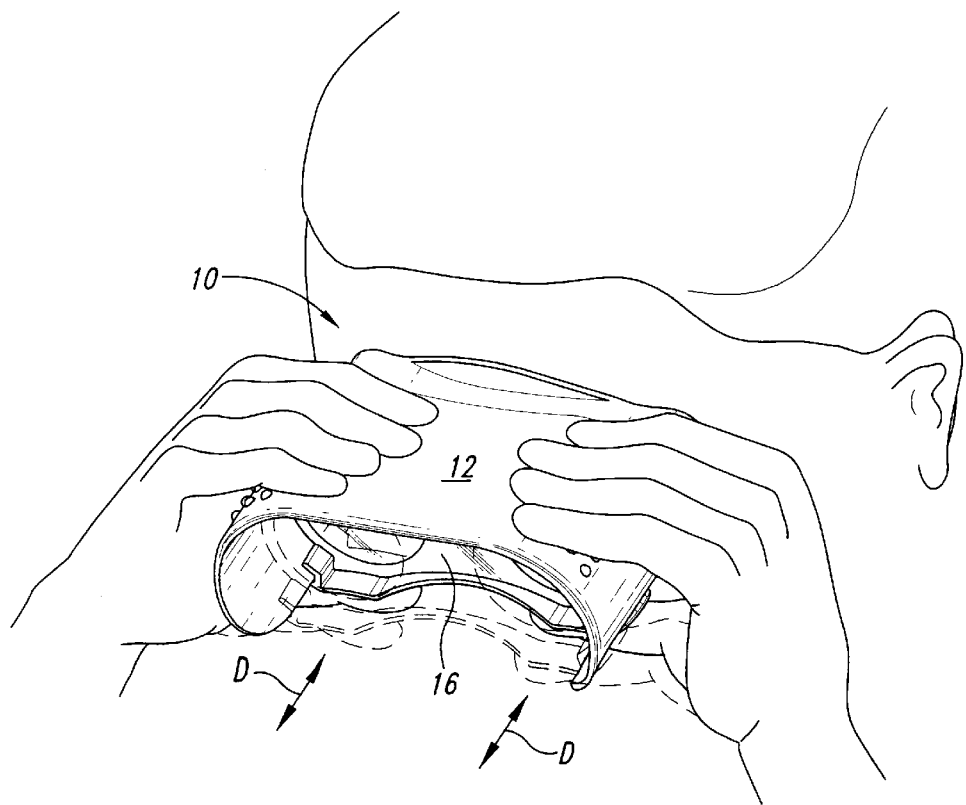
FIG. 6 is a top isometric view of the binoculars of FIG. 1 being used by a user illustrating focus adjustment of the objective lens panel.

The curved portions of the hood 12 also allow the binoculars 10 to be conveniently and comfortably held by a user as shown in FIGS. 3 and 6. In the embodiment shown in FIGS. 1–6, the hood 12 includes a stylized, forward raised outer surface 28 that is raised from the top surface portion 23 of the top portion 22. The raised outer surface 28 has an edge running along the hood as shown and includes grip knobs 30. The raised surface 28 and the shape and arrangement of grip knobs 30 are design features adding certain aspects of style to the binoculars 10. Some embodiments of the hood are made by injection molding of a durable plastic material.

The eyepiece lens panel 14 is of one piece construction having left and right lenses 32 and 34 integrally surrounded by a flat plate frame 36 where both the left and right lenses and the frame are integrally formed. The eyepiece lens panel 14 has left and right edge portions 38 and 40 that are curved to substantially match the curvature of the inner surface 23 of the left and right side portions 18 and 20, respectively, of the hood 12. In some embodiments, each alignment member 26a–26c includes a pair of extensions 42a and 42b spaced from one another with a gap 42c therebetween and projecting inward from the inner surface 23 of the hood 12. The gap 42c of the each alignment member 26 is sized according to a thickness "T" (see FIG. 2) of the edge portion of flat plate frame 36 of the eyepiece lens panel 14 so that the flat plate frame is able to fit snugly into the gap and to securely hold the eyepiece lens panel in position within the hood. This snug fit helps to align and secure the eyepiece lens panel 14.

In some embodiments, the eyepiece lens panel 14 is injection molded using a material such as plastic that is suitable for lenses. The flat plate frame 36 of the eyepiece lens panel 14 is made in the same injection molding step from the same material as the left and right lenses 32 and 34 resulting in the lenses and the frame of the eyepiece lens panel being integrally part of a one piece construction. The left and right lenses 32 and 34 of the eyepiece lens panel 14 are of particular shape to provide magnification whereas the flat plate frame 36 of the eyepiece lens panel is shaped to provide little or no magnification.

Figure 7:
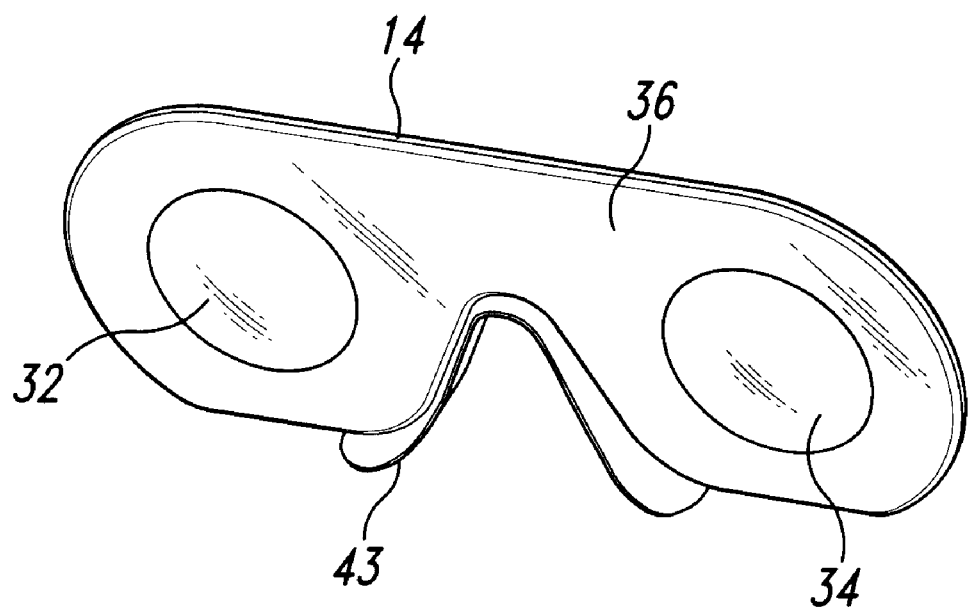
FIG. 7 is an isometric view of an embodiment of the eyepiece lens panel having an enlarged nose bridge support.

The eyepiece lens panel 14 in some embodiments is made from polystyrene which has been found to help reduce visual and color distortion associated with plastic lens for the eyepiece lens panel. Reduction in distortion is helpful since the diameter of the left and right lenses 32 and 34 ranges from 0.6 to 1.6 inches depending on the embodiment. For instance, in some embodiments the diameter of the left and right lenses 32 and 34 of the eyepiece lens panel 14 is 1.0 inches which is relatively large. This large diameter is a factor in allowing the interpupilary distance between the left and right lenses 32 and 34 of the eyepiece lens panel 14 to be fixed so that no adjustment mechanisms are required for this interpupilary distance but yet most users can comfortably use the binoculars 10. The large diameter is also a factor in allowing the binoculars 10 to provide a large field of view, for instance, to help a user view fast paced action. In an embodiment shown in FIG. 7, the eyepiece lens panel 14 includes an additional nose bridge support 43.

The objective lens panel 16 is of one piece construction having left and right lenses 44 and 46 integrally surrounded by a flat plate frame 48 where both the left and right lenses and the frame are integrally formed. The objective lens panel 16 has left and right edge portions 50 and 52 that are curved to substantially match the curvature of the inner surfaces 23 of the left and right side portions 18 and 20, respectively, of the hood 12. In some embodiments, the objective lens panel 16 further includes a left guide 54 located in a lower area of the left edge portion 50 and a right guide 56 located in a lower area of the right edge portion 52. A bridge support 58 runs along a lower edge of the objective lens panel 16 providing structural support for the objective lens panel 16 and joining the left and right guides 54 and 56. In this embodiment, the left guide 54, the right guide 56, and the bridge support 58 are integrally formed along with the left lens 44, the right lens 46, and the flat plate frame 48 of the objective lens panel 16 as part of a one piece construction. Both the left and right guides 54 and 56 each have a pair of extensions 60a and b projecting outward from the objective lens panel frame 48 and the bridge support 58 thereof. The extensions 60a and b of the left and right guides 54 and 56 are spaced from one another with a gap 60c therebetween. The gap 60c is sized to allow the free edge portions 24 of the corresponding lower portions of the left and right side portions 18 and 20, respectively, of the hood 12 to snugly and slidably fit in the gaps. The left and right guides 54 and 56 act as engagement members that frictionally engaged the respective lower portions of the left and right side portions 18 and 20 of the hood 12 so that the objective lens panel frame 48 is moveably attached to the hood 12. This movable attachment of the left and right guides 54 and 56 of the objective lens panel 16 to the respective left and right side portions 18 and 20 of the hood 12 allows forward and rearward movement of the objective lens panel substantially parallel to the lower edge portions of the left and right side portions.

In some embodiments, the objective lens panel 16 is injection molded using a material such as plastic that is suitable for lenses. The frame 48 along with the left and right guides 54 and 56 and the bridge support 58 of the objective lens panel 16 is made in the same injection molding step from the same material as the left and right lenses 44 and 46 resulting in a one piece construction for the objective lens panel. The left and right lenses 44 and 46 of the objective lens panel 16 are of particular shape to provide magnification whereas the flat plate frame 48 of the objective lens panel is shaped to provide little or no magnification.

The objective lens panel 16 in some embodiments is made from acrylic which has been found to help reduce visual and color distortion associated with plastic lens for the objective lens panel. In these embodiments, polystyrene may still be used for the eyepiece lens panel 14 for further reduction in visual and color distortion. Reduction in distortion is helpful since the diameter of the left and right lenses 44 and 46 ranges from 1.0 to 2.2 inches depending on the embodiment. For instance, in some embodiments the diameter of the left and right lenses 44 and 46 of the objective lens panel 16 is 1.6 inches which is relatively large. This large diameter helps to allow the interpupilary distance between the left and right lenses 32 and 34 of the eyepiece lens panel 14 to be fixed so that no adjustment mechanisms are required but yet most users can comfortably use the binoculars 10. The large diameter of the left and right lens 44 and 46 of the objective lens panel 16 is also another factor in allowing the binoculars to provide a large field of view.

Figure 4:
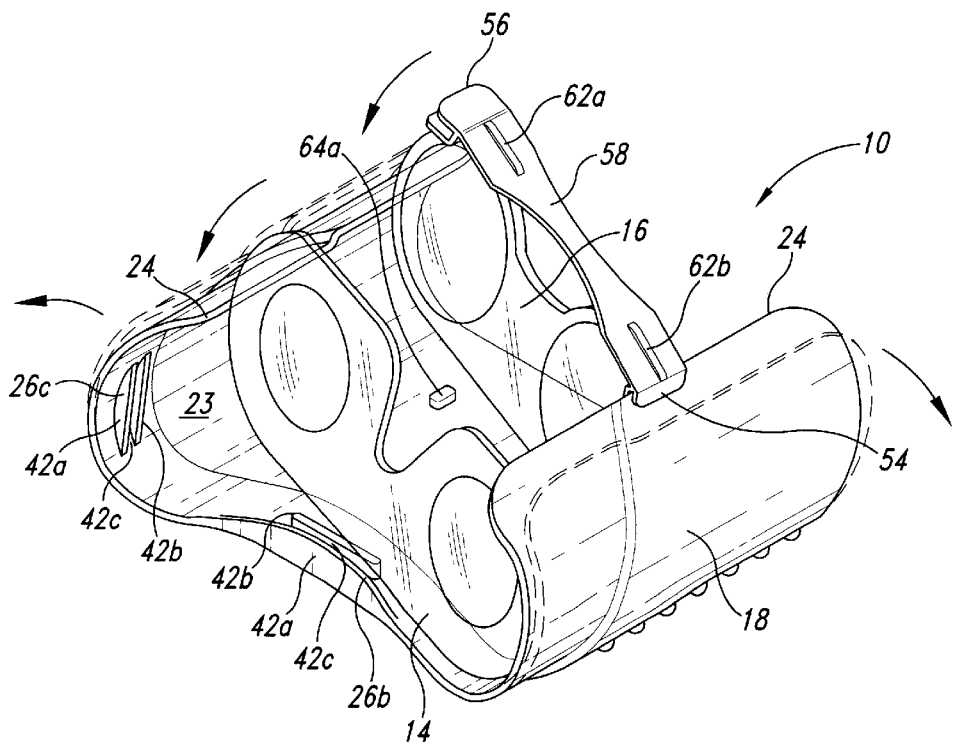
FIG. 4 is an isometric bottom view of the binoculars of FIG. 1 partially assembled.
Figure 5:
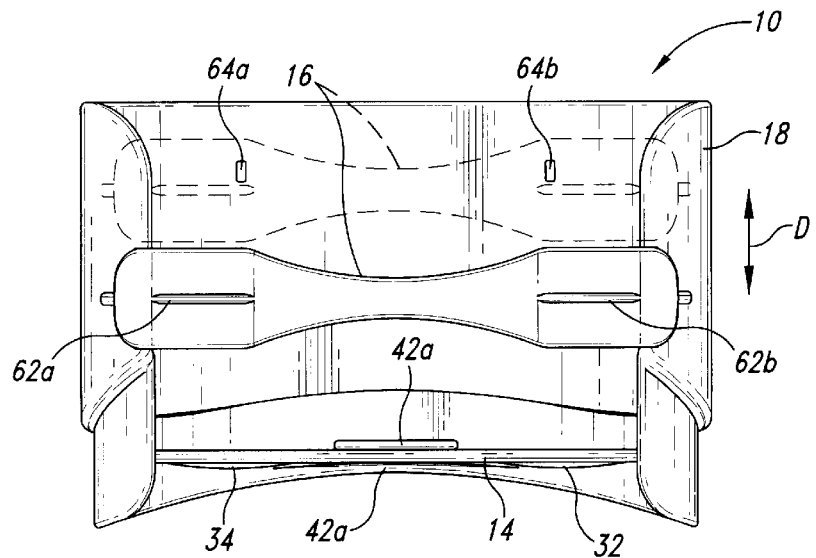
FIG. 5 is a bottom plan view of the binoculars of FIG. 1.

Assembly of the binoculars 10 is accomplished in some embodiments by first applying force to move the free edge portions 24 of the lower portions of the left and right side portions 18 and 20 of the hood 12 away from one another so that the hood 12 is in an outward flexed position. When the hood is in such an outward flexed position, the distance between the free edge portions 24 of the lower portions of the left and right side portions 18 and 20 of the hood 12 will be sufficient to allow clearance for the eyepiece lens panel 14 and the objective lens panel 16 to be slipped into their respective initial positions of engagement as shown in FIG. 4. In their initial positions of engagement, the eyepiece lens panel 14 engages at least one of the alignment members 26a–26c and one of the guides 54 or 56 of the objective lens panel 16 engages one of the left or right side portions 18 or 20, respectively, of the hood 12.

Once the eyepiece lens panel 14 and the objective lens panel 16 are fully in a position within the unobstructed space defined by the hood 12, the force applied to separate the free edge portions 24 can be removed resulting in the free edges moving toward one another and clamping the eyepiece lens panel and the objective lens panel in position with respect to the hood 12 as shown in FIGS. 1, 3, 5, and 6. The hood 12 and panels 14 and 16 are sized from resilient material so that the hood stays in a partially flexed state even when the panels are held by the hood. The partially flexed state of the hood 12 exerts an appropriate amount of inward force against the left and right edge portions 38 and 40 of the eyepiece lens panel 14 to secure the eyepiece lens panel in the alignment members 26a–26c. The force exerted by the hood in the partially flexed state also holds the left and right guides 54 and 56 of the objective lens panel 16 against the free edges 24 of the lower portions of the left and right side portions 18 and 20 of the hood 12.

By using the flexing properties and clamping action of the hood 12, the eyepiece lens panel 14 and objective lens panel 16 are quickly, easily, and inexpensively assembled with the hood to form the binoculars 10. No special tooling (e.g., screwdrivers or wrenches), no addition fastening parts (e.g. screws, bolts, or nuts), and no fastening materials (e.g., adhesives, glues, etc.) are necessary for assembly. Furthermore, assembly is easily performed which allows an option of assembly by the end customer if further cost reduction is desired.

The force exerted by the hood 12 on the guides 54 and 56 is sufficient to prevent unintended forward and rearward movement of the objective lens panel 16 toward or away from the eyepiece lens panel 14 resulting from normal handling of the binoculars 10. The force exerted by the hood 12, while sufficient to maintain the position of the objective lens panel 16, is not so great as to prevent easy intentional forward and rearward movement of the objective lens panel 16 for desired adjustment by the user to focus the binoculars 10. However, while the objective lens panel 16 is being moved, the hood exerts a frictional drag having a tension brake action which prevents too rapid of an adjustment to avoid a loose feel to the user. The position of the objective lens panel 16 is infinitely adjustable within its range of travel since position is maintained by the frictional drag of the tension brake action as compared with a finite adjustment capability of a ratchet arrangement of other binoculars.

A user can focus the binoculars 10 by sliding the objective lens panel 16 with his or her thumbs in both directions indicated by arrows "D" in FIGS. 3 and 6. In some embodiments, the bridge support 58 of the objective lens panel 16 includes left and right thumb tabs 62a and 62b, best seen in FIG. 4, to assist the user in moving the objective lens panel 16 with his or her thumbs. Stops 64a and 64b (see FIGS. 4 and 5) are also included in some embodiments as part of the hood 12 to limit travel of the objective lens panel 16 from within the hood and out the forward opening thereof. The stops 64a and 64b typically extend from the inner surface 23 of the top portion 22 of the hood 12 and are located so that when the objective lens panel 16 is slide fully forward against the stops 64a and 64b, at least a sufficient amount of a forward portion of the hood will still extend forward of the objective lens panel and shade the objective lens panel, as shown in FIGS. 3 and 6. This shading aspect of the hood 12 helps the binoculars to present clearer images to the user by eliminating such occurrences of visual distortion known to those of ordinary skill as "ghost effects." These occurrences are eliminated to an extent dependent upon the degree of extension of the hood past a plane containing the objective lens panel 16.

The many aspects of the binoculars 10 described combine to increase usability of the binoculars during such activities as fast paced episodes in sporting events. For instance, when first directing the binoculars 10 toward an area of interest, the transparency of both the eyepiece lens panel 14 and the objective lens panel 16, especially the flat plate frames 36 and 48 thereof, allows a user to look through the binoculars without having to look only through the lenses. By not having to look through the lenses to see the area of interest, the user can look through the binoculars and obtain an unmagnified view as the binoculars are brought toward his or her eyes, as shown in FIG. 3. This aspect of the binoculars 10 allows the user to first locate an area of interest without the binoculars and then transition to viewing the area of interest with the binoculars while maintaining almost continuous sight of the area of interest.

Other aspects of the binoculars 10 help a user to track action once the binoculars has been directed to an area of interest. The combined optics of the eyepiece lens panel 14 and the objective lens panel 16 result in magnification levels between two and four times and a fields of view between 10 degrees and 17 degrees depending upon the embodiment. Magnification kept within this range allows a user to comfortably track fast paced action and to maintain a reasonable size for the binoculars 10 without having to resort to using prisms or mirrors or other devices or components that would increase the piece count and cost of the binoculars. For instance, one embodiment has a magnification level of 2.4 with a 14 degree field of view at a 0.4 inch eye relief (distance between eyeball and the left or right lens 32 and 34 of the eyepiece lens panel 14) and a spacing of 1.5 inches between the eyepiece lens panel 14 and the objective lens panel 16.

From the foregoing it will be appreciated that, although specific embodiments of the invention have been described herein for purposes of illustration, various modifications may be made without deviating from the spirit and scope of the invention. Accordingly, the invention is not limited except as by the appended claims.

It is claimed:

1. An optical system comprising:
  a support member having left and right side portions integrally formed with a top portion, the top portion having left and right side portions and an inner surface, the left and right side portions having upper and lower portions and an inner surface, the upper portion of the left side portion being integral with the left portion of the top portion, the upper portion of the right side portion being integral with the right portion of the top portion, the left and right side portions extending from the inner surface of the top portion, such that portions of the inner surfaces of the top portion and the left and right side portions together define an unobstructed space therebetween, the lower portion of the left side portion having a lower free edge portion, the lower portion of the right side portion having a lower free edge portion, the lower free edge portions being in opposing relation and defining an open ended lower extent of the unobstructed space, the support member having an unflexed position and one or more flexed positions, the lower free edge portions being spaced apart farther in the one or more flexed positions than in the unflexed position;

an eyepiece lens panel having left and right lenses and a frame, the eyepiece lens panel frame being positioned within the unobstructed space and abutting the support member at a rearward end thereof, a portion of the eyepiece lens panel frame between the left and right lenses thereof being transparent; and an objective lens panel having left and right lenses and a frame, the left lenses of the eyepiece lens panel and the objective lens panel being aligned along a first common axis, the right lenses of the eyepiece lens panel and the objective lens panel being aligned along a second common axis, the objective lens panel frame being moveably positioned within the unobstructed space toward a forward end of the support member and moveably attached to the lower free edge portions of the left and right side portions of the support member such that the support member is in one of the flexed positions, a portion of the objective lens panel frame between the left and right lenses thereof being transparent and being aligned with the transparent portion of the eyepiece lens panel frame along a third common axis.

2. The optical system of claim 1 wherein the left and right lenses of the eyepiece lens panel and the eyepiece lens panel frame are part of one continuous piece of material and the left and right lenses of the objective lens panel and the objective lens panel frame are part of one continuous piece of material.

3. The optical system of claim 1 wherein portions of the inner surfaces of the left and right side portions are shaped with respect to left and right edge portions of the eyepiece lens panel frame to position at least a portion of the left edge portion of the eyepiece lens panel frame with the inner surface of the left side portion of the support member and to position at least a portion of the right edge portion of the eyepiece lens panel frame adjacent to the inner surface of the right side portion of the support member.

4. The optical system of claim 1 wherein portions of the inner surfaces of the left and right side portions are shaped to position the lower free edge portions in opposing relation and the objective lens panel frame having left and right guides outwardly extending from the objective lens panel, the left guide having an outwardly facing slot to engage the left guide with at least a portion of the lower free edge portion of the left side portion, and the right guide having an outwardly facing slot to engage the right guide with at least a portion of the lower free edge portion of the right side portion.

5. The optical system of claim 1 wherein the support member comprises a resilient material so sized and shaped to be partially flexed when the objective lens panel frame is moveably attached to the left and right side portions.

6. The optical system of claim 1 wherein the support member is so sized and made from resilient material to clamp the objective lens panel and provide moveable attachment by frictional engagement of the objective lens panel with the support member.

7. An optical system comprising:

a support member having left and right side portions integrally formed with a top portion, the top portion having left and right side portions and an inner surface, the left and right side portions having upper and lower portions and an inner surface, the upper portion of the left side portion being integral with the left portion of the top portion, the upper portion of the right side portion being integral with the right portion of the top portion, the left and right side portions extending from the inner surface of the top portion, such that portions of the inner surfaces of the top portion and the left and right side portions together define an unobstructed space therebetween, the lower portion of the left side portion having a lower free edge portion, the lower portion of the right side portion having a lower free edge portion, the lower free edge portions being in opposing relation and defining an open ended lower extent of the unobstructed space, the support member having an unflexed position and one or more flexed positions, the lower free edge portions being spaced apart farther in the one or more flexed positions than in the unflexed position, the support member applying forces toward the unobstructed space when in the one or more flexed positions;

an eyepiece lens panel having left and right lenses and a frame, the eyepiece lens panel frame being positioned within the unobstructed space and abutting the support member at a rearward end thereof; and an objective lens panel having left and right lenses and a frame, the objective lens panel frame being moveably positioned within the unobstructed space toward a forward end of the support member and moveably attached to the left and right side portions of the support member, the support allowing for detachment of the objective lens panel from the support member when the support member is in one of the flexed positions.

8. The optical system of claim 7 wherein the left and right lenses of the eyepiece lens panel are integrally formed with the eyepiece lens panel frame and the left and right lenses of the objective lens panel are integrally formed with the objective lens panel frame.

9. The optical system of claim 7 wherein a portion of the eyepiece lens panel frame between the left and right lenses thereof and a portion of the objective lens panel frame between the left and right lenses thereof are transparent.

10. The optical system of claim 7 wherein portions of the inner surfaces of the left and right side portions are inwardly concaved and left and right edge portions of the eyepiece lens panel frame are outwardly curved to position at least a portion of the left edge portion of the eyepiece lens panel frame with the inner surface of the left side portion of the support member and to position at least a portion of the right edge portion of the eyepiece lens panel frame adjacent to the inner surface of the right side portion of the support member.

11. The optical system of claim 7 wherein portions of the inner surfaces of the left and right side portions are inwardly concaved to position the lower free edge portions in opposing relation and the objective lens panel frame having left and right guides outwardly extending from the objective lens panel, the left guide having an outwardly facing slot to engage the left guide with at least a portion of the lower free edge portion of the left side portion, and the right guide having an outwardly facing slot to engage the right guide with at least a portion of the lower free edge portion of the right side portion.

12. The optical system of claim 7 wherein the objective lens panel frame further includes a bridge support integrally formed with the objective lens panel frame, the bridge support having left and right end portions, the left end portion of the bridge support being integral with a left guide of the objective lens panel frame moveably attached to the lower portion of the left side portion and the right end portion of the bridge support being integral with a right guide of the objective lens panel frame moveably attached to the lower portion of the right side portion.

13. The optical system of claim 7 wherein portions of the support member are resilient and in a partially flexed position when the objective lens panel frame is moveably attached to the left and right side portions.

14. The optical system of claim 7 wherein the eyepiece lens panel frame further includes a nose bridge positioned between the left and right lenses of the eyepiece lens panel frame.

15. The optical system of claim 7, further including at least one stop integral to one of the inner surfaces of the top portion, the right side portion or the left side portion of the support member, the stop contacting a portion of the objective lens panel frame when moved into a fully forward position to limit further forward movement of the objective lens panel within the unobstructed space.

16. The optical system of claim 7, further including an eyepiece lens panel alignment member formed integral with the inner surface of one of the top, left side, or right side portions of the support member, the eyepiece lens panel frame having front and rear surfaces, one of the front or rear surfaces of the eyepiece lens panel frame abutting the alignment member.

17. The optical system of claim 7 wherein the objective lens panel frame further includes thumb grips positioned at a lower side of the objective lens panel frame.

18. The optical system of claim 7 wherein the objective lens panel frame further includes thumb grips positioned at a lower side of the objective lens panel frame at least partially located outside of the unobstructed space.

19. The optical system of claim 7 wherein the left and right portions of the top portion of the support member are curved downward.

20. The optical system of claim 7, further including at least one eyepiece lens panel retainer member formed integral with the inner surface of each of the left side and right side portions of the support members, with the retainer members of the left side and right side portions of the support members engaging a left edge portion and a right edge portion of the eyepiece lens panel frame and holding the eyepiece lens panel frame in place within the unobstructed space, and wherein when the support member is sufficiently resilient that when moved into an outwardly flexed position, a sufficient distance exists between the inner surfaces of the left side and right side portions of the support members such that the left and right edge portions of the eyepiece lens panel frame can be moved into a position for engagement by the retainer members of the left side and right side portions of the support member when the support member is allowed to move inward from the outwardly flexed position.

21. The optical system of claim 7 wherein the objective lens panel frame further includes left side and right side engagement members moveably attached to the respective lower portions of the left side and right side portions of the support member.

22. The optical system of claim 7 wherein the left side engagement member of the objective lens panel frame frictionally engages the lower portion of the left side portion of the support member and is slidably disposed thereon, and the right side engagement member of the objective lens panel frame frictionally engages the lower portion of the right side portion of the support member and is slidably disposed thereon.

23. The optical system of claim 7 wherein the support member is so sized and made from such resilient material to clamp the objective lens panel and provide a tension braking effect for the movable attachment of the objective lens panel to the support member.

24. The optical system of claim 7 wherein the support member further has a rearward portion that extends rearward of where the eyepiece lens panel abuts the support member and wherein the eyepiece lens panel further has a nose bridge support, the rearward portion and the nose bridge support contoured for conformity with a user's face, brow, and nose.

25. The optical system of claim 7 wherein portions of the support member are resilient, and the eyepiece lens panel frame further includes left side and right side edge portions, the left side edge portion of the eyepiece lens panel frame abutting at least a portion of the inner surface of the left side portion of the support member and the right side edge portion of the eyepiece lens panel frame abutting at least a portion of the inner surface of the right side portion of the support member and applying inwardly directed retaining forces on the eyepiece lens panel frame when positioned within the unobstructed space with the support member in a partially flexed position.

26. The optical system of claim 7 wherein the objective lens panel further includes left and right side guides connected to and supporting the objective lens panel frame, the left side guide slideably attached to the lower edge portions of the left side portion of the support member and the right side guide slideably attached to the lower edge portions of the right side portion of the support member, the slideable attachment of the left side and right side guides of the objective lens panel to the left side and right side portions of the support member allowing forward and rearward movement of the objective lens panel substantially parallel to the lower edge portions of the left side and right side portions of the support member.

27. The optical system of claim 7 wherein the eyepiece lens panel is made from polystyrene and the objective lens panel is made from acrylic.

28. The optical system of claim 7 wherein the left and right lenses of the eyepiece lens panel have a diameter from the range of 0.6 to 1.6 inches and the left and right lenses of the objective lens panel have a diameter from the range of 1.0 to 2.2 inches.

29. The optical system of claim 7 wherein the left and right lenses of the eyepiece lens panel and the left and right lenses of the objective lens panel are configured to provide a magnification from a range of two to four times.

30. The optical system of claim 7, further including at least one stop integral to one of the inner surfaces of the top portion, the right side portion or the left side portion of the support member, the stop contacting a portion of the objective lens panel frame when moved into a fully forward position to prevent further forward movement of the objective lens panel within the unobstructed space past a forward point, the support member further including a forward portion extending forward of the forward point.

31. The optical system of claim 7 wherein the left and right lenses of the eyepiece lens panel and the left and right lenses of the objective lens panel are configured to provide a field of view from a range of 10 to 17 degrees.

32. A binoculars comprising:
   a flexible support member having first and second side portions, the flexible support member having an unflexed position, the flexible support member being resilient to flex in one or more flexed positions when flexing forces are applied to the flexible support member, the flexible support member applying counterforces in directions opposite the flexing forces when the flexible support member is in the one or more flexed positions;
   a pair of eyepiece lenses, the eyepiece lenses being either convergent or divergent, the eyepiece lens pair coupled to the support member, the eyepiece lens pair positioned to share a common plane; and
   a pair of objective lenses, the objective lenses being either convergent or divergent, the objective lens pair coupled to the support member, the support member allowing for movement of the objective lenses when the flexible support member is in one of the flexed positions; and
   a forehead member configured to engage with a user's forehead.

33. The binoculars of claim 32 wherein the forehead member extends from a rearward end of the support member.

34. A binoculars comprising:
   a pair of eyepiece lenses, the eyepiece lenses being either convergent or divergent, the eyepiece lenses sharing a common plane;
   a pair of objective lenses, the objective lenses being either convergent or divergent; and
   a member having an unflexed position and a flexed position, the member having at least a pair of opposingly positioned locations on the member being spaced apart farther when the member is in the flexed position than when the member is in the unflexed position, the member coupled to the eyepiece lens pair and the objective lens pair such that the member is in the flexed position and the member is applying forces directed toward the objective lens pair when the member is in the flexed position, the eyepiece lens pair being rearward of the objective lens pair, the member extending rearwardly from the common plane of the eyepiece lens pair to be engageable with a user's forehead.

35. The optical system of claim 1 wherein the rearward end of the support member comprises a forehead member configured to engage with a user's forehead.

36. The optical system of claim 7 wherein the rearward end of the support member is configured to contactably abut with a user's forehead.

37. A binocular optical system comprising:
   a one piece support member having a base and first and second extensions with free ends extending from opposite ends of the base, the support member including rearward and forward portions, the base and extensions of the support member of material and shape configured to bend resiliently, the support member having an unflexed and first and second flexed positions, the free ends of the first and second extensions being spaced farther from each other for the first flexed position than the unflexed position and farther from each other for the second flexed position than the first flexed position;
   an eyepiece lens panel having first and second lenses and a frame, the frame having first and second ends, the first and engaging the rearward portion of the fist extension and the second end engaging the rearward portion of the second extension when the support member is in the first flexed position, at least one of the first end disengaged from the first extension or the second end disengaged from the second extension when the support member is in the second flexed position, a portion of the first and second lenses of the eyepiece lens panel being transparent; and
   an objective lens panel having first and second lenses and a frame, the frame having first and second ends, the first end moveably engaging a portion of the forward portion of the free end of the first extension and the second end moveably engaging a portion of the forward portion of the free end of the second extension when the support member is in the first flexed position, at least one of the first end disengaged from the first extension or the second end disengaged from the second extension when the support member is in the second flexed position, a portion of the first and second lenses of the objective lens panel being transparent.

38. The binocular optical system of claim 37 wherein the left and right lenses of the eyepiece lens panel and the eyepiece lens panel frame are formed from a single mold.

39. The binocular optical system of claim 37 wherein the objective lens panel frame is configured to moveably engage the support member by a frictional braking action.

40. The optical system of claim 37 wherein a rearward end of the rearward portion of the clamp is configured to engage with a user's forehead.

41. A binoculars comprising of:
   a one piece support member having a left side, a right side, and a bridge grip, the sides connected by the bridge grip the left side and the right side bounding an unobstructed space therebetween, the one piece support member having an unflexed position and a flexed position, at least one location on the left side being spaced further from at least one location on the right side when the one piece support member is in the flexed position compared to being in the unflexed position, the one piece support member applying forces toward the unobstructed space when in the one or more flexed positions;
   an eyepiece panel being in the unobstructed space and extending between the left and right sides of the support member, the eyepiece panel having two lenses and a frame, the eyepiece panel attached to the left and right sides, a portion of the two lenses of the eyepiece panel being transparent; and
   an objective panel being in the unobstructed space and extending between the left and right sides, the objective panel having two lenses and a frame, the objective panel moveably attached to the left and right sides, the one piece support member allowing detachment of the objective panel from the left and right sides when the one piece support member is in the flexed position and applying forces directed to the objective panel when the one piece support member is in the flexed position, the objective panel parallel to the eyepiece panel, a portion of the two lenses of the objective panel being transparent.

42. A binocular optical system comprising:
   a support member with a top, two opposing sides and an open bottom, the support member having an unflexed position and a flexed position, a pair of locations on the support member with one of each of the pair being on each of the two opposing sides and being spaced farther apart when the support member is in the flexed position than when the support member is in the unflexed position;

an eyepiece panel fixed between the two sides, the eyepiece panel having two lenses and a frame configured to frame the two lenses, a portion of the two lenses of the eyepiece panel being transparent; and an objective panel bridging between the two sides and parallel to the first panel, the objective panel configured to move in directions parallel to the sides toward and away from the eyepiece panel, the objective panel having two lenses and a frame configured to frame the two lenses, a portion of the two lenses of the objective panel being transparent, the support member allowing for movement of the objective panel when the support member is in the flexed position, the support member applying forces on to the objective panel when the support member is in the flexed position.

43. A method for assembling a binoculars comprising:

providing a support member having a base and first and second arms, the first and second arms having free ends, the first arm extending from a first end of the base, the second arm extending from a second end of the base, the base and arms of the support member configured to bend resiliently;

moving the first and second arms away from one another by applying a force to bend the support member from an unflexed position to a first flexed position;

placing an eyepiece lens panel between the first and second arms, the eyepiece lens panel having two lenses, the two lenses having transparent portions;

placing an objective lens panel between the first and second arms, the objective lens panel being parallel to the eyepiece lens panel, the objective lens panel having two lenses, the two lenses having transparent portions; and relaxing the applied force to return the first and second arms toward the unflexed position of the support member in a second flexed position and to contain the eyepiece lens panel and the objective lens panel between the first and second arms.

44. A binocular optical system comprising:

a support member with a top, two opposing sides and an open bottom, the support member having an unflexed position and a flexed position, a pair of locations on the support member with one of each of the pair being on each of the two opposing sides and being spaced farther apart when the support member is in the flexed position than when the support member is in the unflexed position, the top having rearward end portion configured to contact a user's forehead;

an eyepiece panel fixed between the two sides, the eyepiece panel having two lenses having transparent portions and a frame configured to frame the two lenses; and an objective panel bridging between the two sides, such that the support member is in the flexed position and applying forces on to the objective panel, the objective panel being parallel to the first panel, the objective panel configured to move in directions parallel to the sides toward and away from the eyepiece panel, the eyepiece panel nearer the rearward edge of the support member than the objective panel, the objective panel having two lenses having transparent portions and a frame configured to frame the two lenses.

45. The binocular optical system of claim 44 wherein the rearward end portion of the top is a rearward edge of the top.

46. The binocular optical system of claim 44 wherein the rearward end portion of the top is a flat portion of the top.

47. The binocular optical system of claim 44 wherein the rearward end portion of the top is a plurality of flat or curved surfaces.

48. An optical system comprising:

a support member having left and right side portions integrally formed with a top portion, the left and right side portions extending from the top portion to define an unobstructed space therebetween, the left side portion having a lower free edge portion, the right side portion having a lower free edge portion, the lower free edge portions being in opposing relation and defining an open ended lower extent of the unobstructed space, the support member having an unflexed position and one or more flexed positions, the lower free edge portions being spaced apart farther in the one or more flexed positions than in the unflexed position;

an eyepiece lens panel having left and right lenses and a frame, the eyepiece lens panel frame being positioned within the unobstructed space; and an objective lens panel having left and right lenses and a frame, the objective lens panel frame being moveably positioned within the unobstructed space toward a forward end of the support member and moveably attached to the lower free edge portions of the left and right side portions of the support member, the support member allowing for detachment of the objective lens panel from the left and right side portions when the support member is in one of the flexed positions.

* * * * *

UNITED STATES PATENT AND TRADEMARK OFFICE
CERTIFICATE OF CORRECTION

PATENT NO.    : 6,236,505 B1
DATED         : May 22, 2001
INVENTOR(S)   : John E. Fleck It is certified that error appears in the above-identified patent and that said Letters Patent is hereby corrected as shown below:

<u>Column 8, claim 7,</u>
Line 42, "member, the support allowing" should read -- member, the support member allowing --.

Signed and Sealed this

Second Day of April, 2002

Attest:

JAMES E. ROGAN
Attesting Officer          Director of the United States Patent and Trademark Office